United States Patent [19]

Hung

[11] Patent Number: 5,063,269

[45] Date of Patent: Nov. 5, 1991

[54] ONE-PART PRIMERLESS ADHESIVE

[75] Inventor: Ju-Ming Hung, Yardley, Pa.

[73] Assignee: Essex Specialty Products, Inc., Clifton, N.J.

[21] Appl. No.: 464,828

[22] Filed: Jan. 16, 1990

[51] Int. Cl.$^5$ .............................................. C08L 75/00
[52] U.S. Cl. .................................. 524/296; 428/425.6
[58] Field of Search ............... 524/296, 300, 301, 306, 524/773, 775, 778; 428/425.6

[56] References Cited

U.S. PATENT DOCUMENTS

| | | | |
|---|---|---|---|
| 2,718,516 | 9/1955 | Bortnick | 260/86.1 |
| 2,821,544 | 1/1958 | Holtschmidt | 260/486 |
| 4,089,763 | 5/1978 | Dart et al. | 204/159.23 |
| 4,097,439 | 6/1978 | Darling | 260/31.2 |
| 4,174,307 | 11/1979 | Rowe | 204/159.19 |
| 4,297,448 | 10/1981 | Chang et al. | 525/162 |
| 4,317,894 | 3/1982 | Lewarchik et al. | 525/455 |
| 4,318,833 | 3/1982 | Guagliardo | 524/457 |
| 4,390,645 | 6/1983 | Hoffman et al. | 521/137 |
| 4,572,019 | 9/1984 | Bishop et al. | 350/96.3 |
| 4,644,030 | 2/1987 | Loewrigkeit et al. | 524/457 |
| 4,703,089 | 10/1987 | Damico | 525/245 |
| 4,717,739 | 1/1988 | Chevreux et al. | 522/79 |
| 4,769,419 | 9/1988 | Dawdy | 525/111 |
| 4,775,727 | 10/1988 | Taylor | 525/454 |
| 4,829,123 | 5/1989 | Shigematsu et al. | 525/28 |
| 4,876,308 | 10/1989 | Melby et al. | 524/780 |

Primary Examiner—Maurice J. Welsh

[57] ABSTRACT

Disclosed herein is a one-part adhesive which comprises a mixture of: (a) a polymerizable ethylenically unsaturated urethane polymer; and (b) a polymerizable ethylenically unsaturated acid, acid salt, or acid anhydride wherein component (b) is present in an amount in the range of from about 0.5 weight percent to about 50 weight percent of component (a). Such an adhesive is especially suitable for bonding components together in the manufacture of automobiles, and is particularly suitable for bonding sheet molding compound (SMC) components to metal or to other SMC components.

17 Claims, No Drawings

ONE-PART PRIMERLESS ADHESIVE

BACKGROUND OF THE INVENTION

This invention relates to structural acrylic urethane adhesives. Such adhesives are useful for bonding materials together in the assembly of automobiles. More specifically, this invention relates to an adhesive suitable for bonding fiberglass-reinforced polyester substrates.

Transparent adhesives for glass which comprise urethane acrylates in acyclic acid diluents, and which are suitable for the production of clear glass laminates are known and are described, for example, in U.S. Pat. No. 4,717,739. However, such adhesives are not well suited for bonding fiberglass-reinforced polyester substrates, such as are useful, for example, in the manufacture of vehicles, particularly automobiles. It would be desirable to provide a heat-curable one-part adhesive for bonding fiberglass-reinforced polyester substrates (also referred to as sheet molding compound (SMC) components) to each other or to a metal substrate, which would provide sufficient lap shear strength over a sufficient range of temperatures to be useful in the manufacture of vehicles.

SUMMARY OF THE INVENTION

This invention is a one-part adhesive which comprises a mixture of:
(a) a polymerizable ethylenically unsaturated urethane polymer: and
(b) a polymerizable ethylenically unsaturated acid, acid salt, or acid anhydride
wherein component (b) is present in an amount in the range of from about 0.5 weight percent to about 50 weight percent of component (a).

The adhesive of the invention is a one-part adhesive which advantageously has high strength characteristics when used to bond fiberglass-reinforced polyester substrates without the use of a primer. In addition, the cured adhesive of this invention has a wide-ranging glass transition temperature which makes it suitable for high and low temperature applications.

DETAILED DESCRIPTION OF THE INVENTION

The adhesive of the invention is a thixotropic, heat-curable mixture which, when cured, is a graft copolymer of a urethane and vinyl polymers, wherein the vinyl portion contains pendent acid groups. The copolymer is prepared by copolymerizing an ethylenically unsaturated urethane polymer with an ethylenically unsaturated acid, acid salt, or anhydride. The mixture is preferably prepared with inhibitors which prevent the mixture from copolymerizing before application.

According to the invention, the polymerizable ethylenically unsaturated urethane polymer component (hereafter "unsaturated urethane") of the adhesive is a urethane polymer which has at least one unsaturation site which will copolymerize with the unsaturated acid, acid salt, or anhydride component. The unsaturated urethane preferably has a molecular weight of at least about 1,000, more preferably at least about 2,000, and most preferably at least about 4,000: and is preferably no greater than about 35,000, more preferably no greater than about 15,000, and most preferably no greater than about 10,000.

The unsaturated urethane may be prepared by a variety of methods. For example, this component may be prepared by contacting a polyisocyanate with an unsaturated hydroxy-functional reactant, optionally in the presence of additional active hydrogen-containing compounds and/or additional polyisocyanates. As another example, this component may also be prepared by contacting an unsaturated isocyanate with a hydroxy-functional reactant, optionally in the presence of additional active hydrogen-containing compounds and/or additional polyisocyanates.

Isocyanates which are suitable for use in the preparation of the unsaturated urethane component include aromatic, aliphatic, cycloaliphatic, araliphatic, and heterocyclic polyisocyanates, and mixtures thereof, with alicyclic isocyanates as the most preferred for their stability in light. Preferably, the isocyanate has a functionality of about 2–4 isocyanate groups per molecule, more preferably of about 2–3 isocyanate groups per molecule, and most preferably about 2 isocyanate groups per molecule. Higher functionalities may also be used, but may cause excessive cross-linking, and result in an adhesive which is too viscous to handle and apply easily, and can cause the cured adhesive to be too brittle. Specific examples of isocyanates include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers: 1-isocyanato-3,3,5-trimethyl-5-isocyanato methyl cyclohexane (see e.g., German Auslegeschrift No. 1,202,785): 2,4- and 2,6-hexahydrotolylene diisocyanate and mixtures of these isomers, hexahydro-1,3- and/or 1,4-phenylene diisocyanate, perhydro-2,5'- and/or 4,4'-diphenyl methane diisocyanate, 1,3- and 1,4-phenylene diisocyanate, 2,4- and 2,6-tolylene diisocyanate and mixtures of these isomers, diphenyl methane-2,4'- and/or 4,4'-diisocyanate, naphthylene-1,5-diisocyanate, triphenyl methane-4,4',4"-triisocyanate, polyphenyl polymethylene polyisocyanates of the type obtained by condensing aniline with formaldehyde, followed by phosgenation and such as described for example in British Patents 874,430 and 848,671, perchlorinated aryl polyisocyanates of the type described in German Auslegeschrift 1,157,601, polyisocyanates containing carbodiimide groups of the type described in German Patent 1,092,007, diisocyanates of the type described in U.S. Pat. No. 3,492,330, polyisocyanates containing allophanate groups of the type described, for example, in British Patent 994,890, in Belgian Patent 761,626 and in published Dutch Patent Application No. 7,102,524, polyisocyanates containing isocyanurate groups of the type described in German Patents 1,022,789: 1,222,067 and 1,027,394 and in German Offenlegungsschrift 1,929,034 and 2,004,048, polyisocyanates containing urethane groups of the type described, for example, in Belgian Patent 752,261 or in U.S. Pat. No. 3,394,164, polyisocyanates containing acrylated urea groups as described in German Patent 1,230,778, polyisocyanates containing biuret groups of the type described, for example, in German Patent 1,101,392, in British Patent 889,050 and in French Patent 7,017,514, polyisocyanates obtained by telomerization reactions of the type described, for example, in Belgian Patent 723,640, polyisocyanates containing ester groups of the type described, for example, in British Patents 965,474 and 1,072,956, in U.S. Pat. No. 3,567,763 and in German Patent 1,231,688 and reaction products of the aforementioned isocyanates with acetals as described in German Patent 1,072,385.

Additional polyisocyanates suitable for use in this invention include those described by W. Siefken in *Justus Liebigs Annalen der Chemie*, 562, pp. 75-136, and in U.S. Pat. Nos. 3,284,479: 4,089,835; 4,093,569; 4,221,876; 4,310,448; 4,359,550 and 4,495,309.

Unsaturated isocyanates may also be used in the preparation of the unsaturated urethane component, as described above. As used herein, "unsaturated isocyanate" means a compound containing at least one isocyanate group and at least one ethylenically unsaturated group capable of undergoing free radical initiated addition copolymerization with an unsaturated acid, acid salt, or anhydride such as, for example, methacrylic acid. These unsaturated isocyanates may be prepared by contacting a polyisocyanate with an ethylenically unsaturated alcohol, such as, for example, hydroxyethyl methacrylate, hydroxyethyl acrylate, and vinyl alcohol.

Preferably, the polyisocyanate used to prepare the unsaturated isocyanate has isocyanate groups of varying degrees of reactivity so that one isocyanate group may react preferentially with the ethylenically unsaturated alcohol, leaving other isocyanate groups free to react with additional active hydrogen-containing compounds. For example, if an excess over stoichiometry of isopherone diisocyanate is used to prepare the unsaturated isocyanate, the primary isocyanate group of the isopherone diisocyanate will react with the ethylenically unsaturated alcohol to make the unsaturated isocyanate, leaving the tertiary isocyanate group free to react with additional active hydrogen-containing compounds in the preparation of the unsaturated urethane component. In the preparation of such an unsaturated isocyanate, the polyisocyanate and ethylenically unsaturated alcohol are combined in amounts so that the ratio of isocyanate groups:active hydrogen groups is at least about 1.5, more preferably at least about 1.8, and most preferably at least about 2.0: and is preferably no greater than about 6.5, more preferably no greater than about 5.0, and most preferably no greater than about 3.5.

Additional unsaturated isocyanates which may also be used include, for example, isocyanatoalkyl esters of $\alpha,\beta$-ethylenically unsaturated carboxylic acids, $\alpha,\beta$-ethylenically unsaturated isocyanates, monovinylidene aryl isocyanates, and monovinylidene arylmethyl isocyanates. Such isocyanates and methods for their preparation are described in U.S. Pat. Nos. 4,390,645, 2,718,516, and 2,821,544, and British Patent No. 1,252,099, all of which are hereby incorporated by reference in their entirety. Other unsaturated isocyanates include, for example 2-methyl-5-vinylbenzene-1,4-diisocyanate and 1-(alpha-isocyanato-alpha-methyl)ethyl-3(alpha-methyl) ethenyl benzene.

An unsaturated hydroxy-functional reactant may be used in the preparation of the unsaturated urethane polymer. Examples of such unsaturated hydroxy-functional reactants include unsaturated alcohols such as hydroxyethyl methacrylate, hydroxyethyl acrylate, hydroxyethyl propylacrylate, vinyl alcohol, glycerol mono allyl ether, glycerol methacrylate, N,N-dimethylol-1-butene, and polyols capped with an unsaturated isocyanate, as described in U.S. Pat. No. 4,390,645.

Active hydrogen-containing compounds suitable for use in the practice of this invention include any compound with a plurality of moieties containing a hydrogen atom which is active according to the Zerewitinoff test described by Kohler in the *Journal of the American Chemical Society*, Vol. 49, page 3181 (1927). Illustrative of such active hydrogen moieties are —COOH, —OH, —NH$_2$, —NH—, —CONH$_2$, —SH, and —CONH—. Typical active hydrogen-containing compounds include polyols, polyamines, polyamides, polymercaptans, and polyacids. Examples of such active hydrogen-containing compounds are described in U.S. Pat. Nos. 4,390,645. The active hydrogen-containing compound preferably has an equivalent weight of at least about 250 in order to provide good low temperature properties, and is more preferably at least about 500, and most preferably at least 1,000; and is preferably no greater than about 5,000, more preferably no greater than about 3,000, and most preferably no greater than about 2,000. Preferably, the active hydrogen-containing compound has a functionality of about 2–4 groups per molecule, more preferably of about 2–3 groups per molecule, and most preferably about 2 groups per molecule. Higher functionalities may cause excessive cross-linking, and result in an adhesive which is too viscous to handle and apply easily.

Preferably, the active hydrogen-containing compound is a polyether or polyester polyol. Examples of suitable polyester polyols include those which are the reaction product of a polyhydric alcohol and a polycarboxylic acid, acid anhydride, or acid chloride. Polyether polyols are more preferred for their low glass transition temperatures, and such polyols include polymers of alkylene oxides such as ethylene oxide, propylene oxide, tetrahydrofuran, or mixtures thereof, which are initiated with polyhydric materials such as water or polyhydric alcohols. Most preferably, the active hydrogen-containing compound is a poly(tetramethyleneoxy) polyol with an equivalent weight of at least about 250, more preferably at least about 500, and most preferably at least about 1,000: and is preferably no greater than about 5,000, more preferably no greater than about 3,000, and most preferably no greater than about 2,000.

As described above, the unsaturated urethane may be prepared by several methods, using the reactants previously described. In the preparation of the unsaturated urethane, the reactants are preferably used in quantities such that the ratio of isocyanate groups:active hydrogen groups is at least about 1.00:1.00, more preferably at least about 1.00:1.02, and most preferably at least about 1.00:1.05: and is preferably no greater than about 1.00:1.40, more preferably no greater than about 1.00:1.25, and most preferably no greater than about 1 00:1.10. For example, an excess over stoichiometry of isopherone diisocyanate may be reacted with hydroxyethyl methacrylate to form an unsaturated isocyanate, which may then be reacted with sufficient additional active hydrogen-containing compounds to react with all of the remaining isocyanate functionalities. The number of unsaturation sites in the unsaturated urethane is preferably in the range of at least about 0.2 meq/g, more preferably at least about 0.4 meq/g, and most preferably at least about 0.6 meq/g: and is preferably no greater than about 1.3 meq/g, more preferably no greater than about 1.1 meq/g, and most preferably no greater than about 0.9 meq/g.

The unsaturated urethane is preferably prepared in the presence of a catalyst promoting the formation of urethane linkages, such as, for example, a stannous or stannic compound, such as a stannous salt of a carboxylic acid (e.g., stannous octoate, stannous oleate, stannous acetate, and stannous laurate), a trialkyltin oxide, a dialkytin dicarboxylate (e.g., dibutyltin dilaurate, dibutyltin diacetate, diethyltin diacetate, and dihexyltin diacetate), a dialkyltin dihalide, or a dialkyltin oxide, such as di-2-ethylhexyltin oxide or dioctyltin dioxide, a tertiary amine, or a tin mercaptide. Tertiary amine catalysts include trialkylamines (e.g., trimethylamine, triethylamine), heterocyclic amines, such as N-alkylmorpholines (e.g., N-methylmorpholine, N-ethylmorpholine, dimethyldiaminodiethyl ether, etc.), 1,4-dimethylpiperazine, triethylenediamine, etc., and aliphatic polyamines, such as N,N,N',N'-tetramethyl-1,3-butanediamine. Preferably, the catalyst is dimethylbis[(1-oxododecyl)oxy]-stannane which is preferably present in an amount in the range of from about 0.001 weight percent to about 5 weight percent, based on the weight of the mixture to be catalyzed.

As mentioned above, the unsaturated urethane may be prepared in a two-step procedure by first reacting a polyisocyanate with varying degrees of reactivity with an ethylenically unsaturated alcohol to form an unsaturated isocyanate, and then reacting the unsaturated isocyanate with additional active hydrogen-containing compounds to form an unsaturated urethane in a second step. The use of a polyisocyanate with varying degrees of reactivity is preferred so that one isocyanate group may react preferentially with the ethylenically unsaturated alcohol, leaving other isocyanate groups free to react with additional active hydrogen-containing compounds. When this procedure is followed, it is preferable to add urethane catalyst in small amounts in each step, in order to prevent all of the isocyanate groups in the polyisocyanate from reacting with the unsaturated alcohol in the first step.

The polymerizable ethylenically unsaturated acid, acid salt, or acid anhydride (hereafter "unsaturated acid") is an acid, acid salt, or acid anhydride containing at least one ethylenically unsaturated group capable of undergoing free radical initiated addition polymerization with an unsaturated urethane, and of forming a vinyl addition polymer by addition homopolymerization or copolymerization with at least one other monomer containing one or more internal or terminal polymerizable ethylenically unsaturated groups. Advantageously, this unsaturated acid, when polymerized, increases the glass transition temperature of the adhesive and promotes adhesion to the material to be bonded.

Examples of such unsaturated acids include, for example, free acid, anhydride, and salt forms of methacrylic acid, cis-aconitic acid, trans-aconitic acid, acrylic acid, itaconic acid, 2-sulfoethyl methacrylate, 2-sulfoethyl acrylate, 3-sulfopropyl methacrylate, 3-sulfopropyl acrylate, $\beta$-carboxyl ethyl acrylate, $\beta$-carboxyl, $\beta$-methyl ethyl methacrylate, maleic anhydride, 2-methyacryloxyethyl phosphate, 3-methacryloxypropyl phosphate, p-styrene sulfonic acid, and maleic acid. Preferably, the unsaturated acid is a free acid, anhydride, or salt form of methacrylic acid, cis-aconitic acid, trans-aconitic acid, acrylic acid, itaconic acid, 2-sulfoethyl methacrylate, 2-sulfoethyl acrylate, 3-sulfopropyl methacrylate, 3-sulfopropyl acrylate, $\beta$-carboxyl ethyl acrylate, $\beta$-carboxyl, $\beta$-methyl ethyl methacrylate, maleic anhydride, 2-methyacryloxyethyl phosphate, 3-methacryloxypropyl phosphate; and more preferably is a free acid, anhydride, or salt form of methacrylic acid or acrylic acid, and most preferably is methacrylic acid or acrylic acid.

The unsaturated urethane and the unsaturated acid are preferably combined in a weight ratio of urethane:acid of at least about 2:1, more preferably at least about 4:1, and most preferably at least about 5:1: and is preferably no greater than about 200:1, more preferably no greater than about 12:1, and most preferably no greater than about 9:1.

In another preferred embodiment, the adhesive of the invention also comprises unsaturated plasticizers containing at least one ethylenically unsaturated group capable of undergoing free radical initiated addition polymerization with an unsaturated urethane or unsaturated acid. Examples of such plasticizers include, for example, hexanediol diacrylate, hexanediol dimethacrylate, diallyl phthalate, trimethylol propane, trimethacrylatetrimethylol propane triacrylate, 2-butane-1,4-diol diacrylate, hydroxyethyl methacrylate, hydroxyethyl acrylate, hydroxyethyl propylacrylate, vinyl alcohol, glycerol mono allyl ether, glycerol methacrylate, N,N-dimethylol-1-butene, methyl methacrylate, ethyl methacrylate, butyl methacrylate, methyl acrylate, ethyl acrylate, butyl acrylate, cyclohexyl acrylate, cyclohexyl methacrylate, hexyl acrylate, 2-ethylhexyl acrylate, laurel acrylate, laurel methacrylate, diethylene glycol methacrylate, dicyclopentadienyloxyethyl methacrylate, tetrahydrofurfuryl methacrylate, and glycidyl methacrylate. Preferably, the unsaturated plasticizer contains at least two ethylenically unsaturated groups to provide additional cross-linking capability under vinyl addition polymerization conditions, and is more preferably diallyl phthalate, hexanediol diacrylate, or hexanediol dimethacrylate. Such unsaturated plasticizers are especially useful in formulations for the bonding of sheet molding compounds, as they advantageously increase the cross-linking of the adhesive, reduce the viscosity of the uncured adhesive and promote adhesion to the substrate due to their polarity.

The adhesive of the invention also preferably includes a free radical vinyl polymerization initiator, in an amount of at least about 0.5 percent, more preferably at least about 1.0 percent, and most preferably at least about 2.0 percent; and is preferably no greater than about 15.0 percent, more preferably no greater than about 8.0 percent, and most preferably no greater than about 4.0 percent by weight of the adhesive. This initiator is preferably added to the adhesive when the unsaturated urethane and the unsaturated monomer are combined, and will allow the adhesive to cure at elevated temperatures. Examples of such initiators include, for example, t-amyl perbenzoate, and peroxides such as hydrogen peroxide, diacyl peroxides, ketone peroxides, peroxydicarbonates, peroxyesters, dialkyl peroxides, hydroperoxides, peroxyketals, tert-butyl hydroperoxide, tert butyl peroctoate, and similar percarboxylic acid esters, and azobisisobutyronitrile.

The adhesive of the invention also preferably contains materials which stabilize the unsaturated acid at storage temperatures. Such materials include, for example, talc or surface-treated clay, which preferably has a pH of from about 7.0 to about 10.0, and more preferably from about 9.0 to about 10.0, and which is preferably present in a weight ratio of talc or surface-treated clay: unsaturated acid of from about 1:1 to about 20:1. The adhesive also preferably contains inhibitors, or free radical scavengers, which inhibit the polymerization of the unsaturated urethane and the unsaturated acid at storage temperatures. Examples of such inhibitors include p-benzoquinone and hydroquinone and derivatives thereof, which are preferably present in an amount of from about 0.01 weight percent to about 1.5 weight percent of the adhesive.

The adhesive of the invention may also be compounded with fillers and additives to modify rheological properties such as viscosity, sag resistance, and flow rate. Such materials include, for example, carbon black, surface-treated fumed silicas, titanium dioxide, calcium carbonate, talc, defoaming agents, mica, aluminum oxide, clays, and glass phenolic, or aluminum oxide bubbles. When a surface-treated fumed silica is used, it is preferably used in an amount of from about 1.0 weight percent to about 10.0 weight percent, based on the weight of the unsaturated urethane and unsaturated acid, together. Other additives which are suitable for use in the preparation of the adhesive of the invention include ultraviolet stabilizers and anti-oxidants.

The adhesive of the invention also preferably contains one or more saturated plasticizers to modify the rheological properties of the adhesive. Suitable plasticizers include, for example, 2-ethylhexyl diphenyl phosphate, o-phthalates, adipates, adipic acid, benzoic acid, glycols, phosphoric acid, phthalic acid, and sebacic acid, which are preferably used in an amount of from about 1 weight percent to about 20 weight percent, based on the weight of the adhesive. The saturated plasticizer will advantageously control the shrinkage of the adhesive upon curing.

ILLUSTRATIVE EMBODIMENTS

The following examples are given to illustrate the invention and should not be interpreted as limiting it in any way. Unless stated otherwise, all parts and percentages are given by weight.

EXAMPLE 1

Unsaturated Urethane Preparation

To a reactor is added 123 lb of isopherone diisocyanate, 15 g hydroquinone, and 7.02 g of a tin urethane catalyst. These components are mixed while 43 lb of 2-hydroxy methacrylate is added slowly to the reactor at a temperature of less than about 50° C. A poly(tetramethyleneoxy) polyol (384 lb) with a molecular weight of about 1000 is then added to the reactor at a temperature of less than about 70° C. and the components are mixed for about one hour. The reaction is carried out at these temperatures to help prevent the unsaturated reactants from polymerizing. To this mixture is then added 20.25 g of a tin urethane catalyst, and the components are further mixed until substantially all of the isocyanate groups present have reacted. Diallyl phthalate (197 lb) is then combined with the mixture.

Adhesive Preparation

Adhesive A—A 328-lb portion of the above mixture is compounded under reduced pressure with 152 g of parabenzoquinone, 41 lb of methacrylic acid and 48 lb of 2-ethylhexyl diphenyl phosphate for 30 minutes. Fumed silica (41 lb) is then added and mixed for about 15 minutes. Talc (195 lb) with a pH in the range of from about 9-10 is then added and mixed for about 15 minutes, and 18.56 lb of Lupersol TM TAEC free radical initiator added to the mixture and mixed for about 30 minutes.

Adhesive B—A 500-lb portion of the above unsaturated urethane is compounded under reduced pressure with 232 g of parabenzoquinone, 62 lb of methacrylic acid and 73 lb of 2-ethylhexyl diphenyl phosphate for 30 minutes. Fumed silica (62 lb) is then added and mixed for about 15 minutes. Talc (297 lb) with a pH in the range of from about 9-10 is then added and mixed for about 15 minutes, and 28.24 lb of Lupersol TM TAEC free radical initiator added to the mixture and mixed for about 30 minutes.

Adhesives C-F

Using samples of unsaturated urethane prepared as above, adhesives are prepared as in Example 1A using ratios of components shown in Table I. The adhesive samples were tested bonding samples of GenCorp's Diversitech TM 7113 sheet molding compound (SMC) together. The SMC samples were bonded with a 30 mil thickness of adhesive, cured for 1 hour at 250° F., cooled for 2 hours at room temperature, and heated at 180° F. for 30 min. before testing. The samples were lap shear tested with a 2000 lb. load cell at a speed of 0.5 in/min.

TABLE I

|  | 1C | 1D | 1E | 1F |
|---|---|---|---|---|
| unsaturated urethane, lb | 64.5 | 64.5 | 64.5 | 64.5 |
| para-benzoquinone, lb | 0.1 | 0.1 | 0.1 | 0.1 |
| diallyl phthalate, lb | 24.0 | 24.0 | 24.0 | 24.0 |
| 2-ethylhexyldiphenylphosphate, lb | 13.0 | 13.0 | 13.0 | 13.0 |
| isobornyl methacrylate, lb | — | 3.0 | 6.0 | 9.0 |
| Lupersol-531-80B free radical initiator, lb | 5.0 | 5.0 | 5.0 | 5.0 |
| methacrylic acid, lb | 12.0 | 9.0 | 6.0 | 3.0 |
| fumed silica, lb | 8.5 | 8.5 | 8.5 | 8.5 |
| talc, lb | 60.0 | 60.0 | 60.0 | 60.0 |
| lap shear 180° F. (psi) | 348.4 | 311.4 | 288.4 | 181.2 |
| DL/CSCF/CF/AF (%) | 79/12.5/ | 3/27.5/ | 2/52/ | 0/1.5/ |
| 180° F. | 8.5/0 | 60.5/9 | 46/0 | 92.5/6 |

DL - Delamination - (fiber tear)
CSCF - Close to Surface Cohesive Failure
CF - Cohesive Failure
AF - Adhesive Failure

EXAMPLE 2

Unsaturated Urethane Preparation

To a reactor is added 23.127 lb of isopherone diisocyanate, 0.008 lb hydroquinone, and 0.003 lb of a tin urethane catalyst. These components are mixed while 12 188 lb of 2-hydroxy methacrylate is added slowly to the reactor. A poly(tetramethyleneoxy) polyol (64.667 lb) with a molecular weight of about 1000 is then added to the reactor and the components are mixed for about one hour. To this mixture is then added 0.007 lb of a tin urethane catalyst, and the components are further mixed until substantially all of the isocyanate groups present have reacted.

Adhesive Preparation

Using samples of unsaturated urethane prepared as above, adhesives are prepared and tested for bonding 3 samples of steel coated with an electrodeposition material with 3 samples (X, Y, and Z) of Budd TM 950 sheet molding compound as in Example 1 using the following amounts of components:

TABLE II

|  | 2A | 2B |
|---|---|---|
| unsaturated urethane, lb | 540.9 | 540.9 |
| diallyl phthalate, lb | 201.0 | 201.0 |
| 2-ethylhexyldiphenylphosphate, lb | 108.9 | 108.9 |
| t-amyl perbenzoate, lb | 50.22 | 50.22 |
| methacrylic acid, lb | 134.0 | 134.0 |
| hexanediol dimethacrylate, lb | — | 67.0 |
| fumed silica, lb | 87.9 | 87.9 |

TABLE II-continued

|  | 2A | 2B |
|---|---|---|
| talc, lb | 419.0 | 419.0 |
| lap shear 180° F. (psi) Sample X | 659.1 | 468.0 |
| DL (%)/CSCF (%)/AF (%) 180° F. Sample X | 100/0/0 | 83/16/1 |

| | lap shear 180° F. (psi) Sample Y | 589.0 | 703.8 |
|---|---|---|---|
| | mode of failure 180° F. Sample Y | 80/20/0 | 92/8/0 |
| | lap shear 180° F. (psi) Sample Z | 581.1 | 586.1 |
| | mode of failure 180° F. Sample Z | 20/80/0 | 100/0/0 |

DL - Delamination - (fiber tear)
CSCF - Close to Surface Cohesive Failure
AF - Adhesive Failure

EXAMPLE 3

Unsaturated Urethane Preparation

To a reactor is added 990 g of isopherone diisocyanate, 0.22 g hydroquinone, and 0.12 g of a tin urethane catalyst. These components are mixed while 310 g of 2-hydroxyethyl acrylate is added slowly to the reactor. A poly(tetramethyleneoxy) polyol (3004 g) with a molecular weight of about 1000 is then added to the reactor and the components are mixed for about one hour. To this mixture is then added 0.14 g of a tin urethane catalyst and 1079 g of diallyl phthalate, and the components are further mixed until substantially all of the isocyanate groups present have reacted.

Adhesive Preparation

Using samples of unsaturated urethane prepared as above, adhesives are prepared and tested for bonding samples of sheet molding compound together as in Example 1 using the following amounts of components:

TABLE III

|  | 3A | 3B | 3C | 3D | 3E |
|---|---|---|---|---|---|
| unsaturated urethane, lb | 62.5 | 62.5 | 70.5 | 70.5 | 70.5 |
| para-benzoquinone, lb | 0.1 | 0.1 | 0.1 | 0.1 | 0.1 |
| diallyl phthalate, lb | 8.0 | 8.0 | — | — | — |
| 2-ethylhexyldiphenylphosphate, lb | 13.0 | 13.0 | 13.0 | 13.0 | 13.0 |
| isobornyl methacrylate, lb | 18.0 | 18.0 | 18.0 | 18.0 | 18.0 |
| clay, lb | 50.0 | 50.0 | 50.0 | 50.0 | 50.0 |
| carbon black, lb | 17.0 | 17.0 | 17.0 | 17.0 | 17.0 |
| Lupersol-531-80B free radical initiator, lb | 5.0 | 5.0 | 5.0 | 5.0 | 5.0 |
| hexanediol dimethacrylate, lb | 13.0 | 13.0 | 13.0 | 20.0 | 20.0 |
| methacrylic acid, lb | — | 9.0 | 15.0 | 9.0 | 15.0 |
| fumed silica, lb |  |  |  |  |  |
| talc, lb |  |  |  |  |  |
| lap shear |  |  |  |  |  |
| 180° F. (psi) | 134.9 ± 12.9 | 294.0 ± 19.3 | 319.4 ± 52.7 | 293.3 ± 75.5 | 274.0 ± 66.1 |
| 70° F. (psi) | 405.6 ± 64.5 | 518.0 ± 70.6 | 393.6 ± 57.8 | 342.4 ± 58.3 | 373.9 ± 93.1 |
| delamination/adhesive failure (%) |  |  |  |  |  |
| 180° F. | 0/100 | 45.7/54.3 | 41.2/58.6 | 10/90 | 34.3/65.7 |
| 70° F. | 5/95 | 15/85 | 12.5/87.5 | 1.9/98.1 | 13.6/86.4 |

|  | 3F | 3G | 3H |
|---|---|---|---|
| unsaturated urethane, lb | 80.5 | 80.5 | 80.5 |
| para-benzoquinone, lb | 0.1 | 0.1 | 0.1 |
| diallyl phthalate, lb | 8.0 | 8.0 | 8.0 |
| 2-ethylhexyldiphenylphosphate, lb | 13.0 | 13.0 | 13.0 |
| isobornyl methacrylate, lb | — | — | — |
| clay, lb | 50.0 | 50.0 | 50.0 |
| carbon black, lb | 17.0 | 17.0 | 17.0 |
| Lupersol-531-80B free radical initiator, lb | 5.0 | 5.0 | 5.0 |
| hexanediol dimethacrylate, lb | 13.0 | 20.0 | 20.0 |
| methacrylic acid, lb | 15.0 | 9.0 | 15.0 |
| fumed silica, lb |  |  |  |
| talc, lb |  |  |  |
| lap shear |  |  |  |
| 180° F. (psi) | 321.9 ± 39.5 | 312.7 ± 21.9 | 325.5 ± 28.4 |
| 70° F. (psi) | 552.1 ± 58.2 | 501.4 ± 48.7 | 483.1 ± 44.9 |
| delamination/adhesive failure (%) |  |  |  |
| 180° F. | 99.3/0.7 | 60.7/39.3 | 80.6/19.4 |
| 70° F. | 100/0 | 100/0 | 83.6/16.4 |

EXAMPLE 4

Unsaturated Urethane Preparation

To a reactor is added 761.2 g of isopherone diisocyanate, 0.22 g hydroquinone, and 0.1 g of a tin urethane catalyst. These components are mixed while 250 g of 2-hydroxyethyl methacrylate is added slowly to the reactor. A poly(tetramethyleneoxy) polyol (2086 g) with a molecular weight of about 1000 is then added to the reactor and the components are mixed for about one hour. To this mixture is then added 0.14 g of a tin urethane catalyst and 788 g of diallyl phthalate, and the components are further mixed until substantially all of the isocyanate groups present have reacted.

Adhesive Preparation

Using samples of unsaturated urethane prepared as above, adhesives are prepared and tested for bonding samples of sheet molding compound together as in Example 1 using the following amounts of components:

TABLE IV

|  | 4A | 4B | 4C | 4D | 4E |
|---|---|---|---|---|---|

TABLE IV-continued

| | | | | | |
|---|---|---|---|---|---|
| unsaturated urethane, lb | 80.5 | 80.5 | 80.5 | 80.5 | 80.5 |
| para-benzoquinone, lb | 0.1 | 0.1 | 0.1 | 0.1 | 0.1 |
| diallyl phthalate, lb | 8.0 | 8.0 | 8.0 | 8.0 | 8.0 |
| 2-ethylhexyldiphenylphosphate, lb | 13.0 | 13.0 | 13.0 | 13.0 | 13.0 |
| clay, lb | 50.0 | 50.0 | 50.0 | 50.0 | 50.0 |
| carbon black, lb | 17.0 | 17.0 | 17.0 | 17.0 | 17.0 |
| Lupersol-531-80B free radical initiator, lb | 5.0 | 5.0 | 5.0 | 5.0 | 5.0 |
| hexanediol dimethacrylate, lb | 9.0 | 5.0 | 7.0 | 5.0 | 9.0 |
| methacrylic acid, lb | 12.0 | 12.0 | 9.0 | 9.0 | 7.0 |
| lap shear | | | | | |
| 180° F. (psi) | 380.9 ± 56.5 | 287.1 ± 42.1 | 350.4 ± 38.8 | 323.9 ± 39.1 | 294.1 ± 42.4 |
| 70° F. (psi) | 470.0 ± 61.0 | 524.8 ± 41.2 | 444.4 ± 53.3 | 491.3 ± 62.5 | 506.7 ± 43.9 |
| delamination/adhesive failure (%) | | | | | |
| 180° F. | 93.1/6.9 | 100/0 | 76.3/23.7 | 71.3/28.7 | 51.8/48.2 |
| 70° F. | 100/0 | 100/0 | 100/0 | 100/0 | 88.8/21.2 |

| | 4F | 4G | 4H |
|---|---|---|---|
| unsaturated urethane, lb | 80.5 | 80.5 | 80.5 |
| para-benzoquinone, lb | 0.1 | 0.1 | 0.1 |
| diallyl phthalate, lb | 8.0 | 8.0 | 8.0 |
| 2-ethylhexyldiphenylphosphate, lb | 13.0 | 13.0 | 13.0 |
| clay, lb | 50.0 | 50.0 | 15.0 |
| carbon black, lb | 17.0 | 17.0 | 17.0 |
| Lupersol-531-80B free radical initiator, lb | 5.0 | 5.0 | 5.0 |
| hexanediol dimethacrylate, lb | 7.0 | 9.0 | 3.0 |
| methacrylic acid, lb | 7.0 | 5.0 | 15.0 |
| lap shear | | | |
| 180° F. (psi) | 278.5 ± 45.6 | 246.5 ± 47.0 | 335.0 ± 40.8 |
| 70° F. (psi) | 489.4 ± 25.7 | 460.6 ± 69.8 | 497.1 ± 88.4 |
| delamination/adhesive failure (%) | | | |
| 180° F. | 8.8/91.2 | 4.4/95.6 | 100/0 |
| 70° F. | 65.6/34.4 | 64.4/35.6 | 96.3/3.7 |

EXAMPLE 5

Unsaturated Urethane Preparation

To a reactor is added 747.1 g of isopherone diisocyanate, 7.0 g p-benzoquinone, and 0.1 g of a tin urethane catalyst. These components are mixed while 350 g of 2-hydroxyethyl methacrylate is added slowly to the reactor at a temperature of less than about 50° C. A poly(tetramethyleneoxy) polyol (2109.7 g) with a molecular weight of about 1000 is then added to the reactor at a temperature of less than about 70° C. and the components are mixed for about one hour. To this mixture is then added 0.26 g of a tin urethane catalyst, and the components are further mixed until substantially all of the isocyanate groups present have reacted. Diallyl phthalate (197 lb) is then combined with the mixture.

Adhesive Preparation

A 720.4 portion of the above mixture is compounded under reduced pressure with 134.0 g of diallyl phthalate, 75.3 g of hexanediol dimethacrylate, 108.9 g of methacrylic acid and 108.9 g of 2-ethylhexyl diphenyl phosphate for 30 minutes. Fumed silica (125.6 g) is then added and mixed for about 15 minutes. Talc (502.2 g) with a pH in the range of from about 9–10 is then added and mixed for about 15 minutes, and 41.9 g t-amyl perbenzoate (free radical initiator) is added to the mixture and mixed for about 30 minutes.

Samples of the adhesive are tested for bonding a sample of steel coated with an electrodeposition material with a samples of Budd ™ 950 sheet molding compound a in Example 1 give the following results:

TABLE V

| | 2A |
|---|---|
| lap shear 180° F. (psi) | 633.6 ± 61.7 |
| DL (%)/CSCF (%)/AF/PF (%) 180° F. | 98/0/2/0 |
| lap shear −30° F. (psi) | 876.1 ± 93.1 |
| DL (%)/CSCF (%)/PF (%) 180° F. | 7.5/5/0/87.5 |
| side impact −30° F. (in × lb) | 57.02 ± 0.9 |
| DL (%)/CSCF (%)/SUBST (%) 180° F. | 0/0/100 |

DL - Delamination - (fiber tear)
CSCF - Close to Surface Cohesive Failure
AF - Adhesive Failure
PF - Electrodeposition Coating Failure
SUBST - Substrate (SMC) Failure

What is claimed is:

1. A one-part adhesive which comprises a mixture of:
   (a) a polymerizable ethylenically unsaturated urethane polymer: and
   (b) a polymerizable ethylenically unsaturated acid, acid salt, or acid anhydride
wherein component (b) is present in an amount in the range of from about 0.5 weight percent to about 25 weight percent of component (a).

2. The adhesive of claim 1 wherein component (a) has a molecular weight of at least about 1,000.

3. The adhesive of claim 1 wherein component (a) comprises the reaction product of a heterocyclic diisocyanate and an unsaturated alcohol.

4. The adhesive of claim 1 wherein component (a) comprises the reaction product of isopherone diisocyanate and an unsaturated alcohol.

5. The adhesive of claim 1 wherein component (a) comprises the reaction product of hydroxyethyl methacrylate or hydroxyethyl acrylate and a polyisocyanate.

6. The adhesive of claim 1 wherein component (b) comprises methacrylic acid.

7. The adhesive of claim 1 which additionally comprises an ethylenically unsaturated plasticizer containing at least one ethylenically unsaturated group capable of undergoing free radical initiated addition polymerization with component (a) or (b).

8. The adhesive of claim 7 wherein the unsaturated plasticizer contains at least two ethylenically unsaturated groups capable of undergoing free radical initiated addition polymerization with component (a) or (b).

9. The adhesive of claim 7 wherein the ethylenically unsaturated plasticizer comprises diallyl phthalate.

10. The adhesive of claim 7 wherein the ethylenically unsaturated plasticizer comprises hexanediol dimethacrylate.

11. The adhesive of claim 1 which additionally comprises talc or surface-treated clay with a pH in the range of from about 7.0 to about 10.0.

12. The adhesive of claim 11 wherein the talc or surface-treated clay is present in an amount such that the weight ratio of talc or surface-treated clay:unsaturated acid is in the range of from about 1:1 to about 20:1.

13. The adhesive of claim 1 which additionally comprises a fumed silica, which is present in an amount of from about 1.0 weight percent to about 10.0 weight percent, based on the weight of components (a) and (b) together.

14. A composite comprising a fiberglass-reinforced polyester substrate bonded to a second substrate, by means of a cured layer of a one-part adhesive between said substrates comprising a mixture of
 (a) a polymerizable ethylenically unsaturated urethane polymer; and
 (b) a polymerizable ethylenically unsaturated acid, acid salt, or acid anhydride
wherein component (b) is present in an amount in the range of from 0.5 to 50 weight percent of component (a).

15. The composite of claim 14 wherein the adhesive additionally comprises (c) talc or surface-treated clay with a pH in the range of from 7.0 to 10.0.

16. The composite of claim 15 wherein the talc or surface-treated clay is present in an amount such that the weight ratio of talc or surface-treated clay:unsaturated acid is in the range of from 1:1 to 20:1.

17. The composite of claim 14 wherein the adhesive additionally comprises (c) an ethylenically unsaturated plasticizer containing at least two ethylenically unsaturated groups capable of undergoing free radical initiated addition polymerization with component (a) or (b).

* * * * *